US012266266B2

(12) United States Patent
Yamamoto et al.

(10) Patent No.: US 12,266,266 B2
(45) Date of Patent: Apr. 1, 2025

(54) MOBILE OBJECT MANAGEMENT DEVICE, MOBILE OBJECT MANAGEMENT METHOD, AND STORAGE MEDIUM

(71) Applicant: HONDA MOTOR CO., LTD., Tokyo (JP)

(72) Inventors: Sachiko Yamamoto, Wako (JP); Shinichiro Kobashi, Wako (JP); Makoto Hasegawa, Wako (JP); Naoto Shikano, Wako (JP); Shota Yamaguchi, Wako (JP); Marika Mochizuki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 283 days.

(21) Appl. No.: 17/953,353

(22) Filed: Sep. 27, 2022

(65) Prior Publication Data

US 2023/0108144 A1 Apr. 6, 2023

(30) Foreign Application Priority Data

Sep. 30, 2021 (JP) .................................. 2021-161619

(51) Int. Cl.
*B60Q 9/00* (2006.01)
*B62K 11/00* (2006.01)
(Continued)

(52) U.S. Cl.
CPC ......... *G08G 1/096725* (2013.01); *B60Q 9/00* (2013.01); *H04W 4/023* (2013.01);
(Continued)

(58) Field of Classification Search
CPC ....... G08G 1/096725; G08G 1/096741; G08G 1/096775; B60Q 9/00; H04W 4/023;
(Continued)

(56) References Cited

U.S. PATENT DOCUMENTS

2020/0130771 A1* 4/2020 Jacobsz Rosier ........ B62J 45/20
2020/0143237 A1* 5/2020 Gordon .................... G06N 3/08
(Continued)

FOREIGN PATENT DOCUMENTS

JP 2004-039415 2/2004
JP 2018-177043 11/2018
(Continued)

OTHER PUBLICATIONS

Japanese Notice of Allowance for Japanese Patent Application No. 2021-161619 mailed Jul. 25, 2023.

*Primary Examiner* — Adam R Mott
*Assistant Examiner* — Heather J Keniry
(74) *Attorney, Agent, or Firm* — Amin, Turocy & Watson, LLP

(57) ABSTRACT

A mobile object management device that manages a boarding-type mobile object that moves within a predetermined area with a user on board includes an acquirer configured to acquire positional information of the boarding-type mobile object, a manager configured to manage the boarding-type mobile object and a terminal device of a user on the boarding-type mobile object in association with each other, and an event operation commander configured to cause the boarding-type mobile object to execute a predetermined operation in accordance with an event performed in the predetermined area via the terminal device of the user on the basis of the positional information and information on the event.

15 Claims, 13 Drawing Sheets

(51) Int. Cl.
  *G05D 1/00*  (2024.01)
  *G06Q 10/063*  (2023.01)
  *G06Q 50/10*  (2012.01)
  *G08G 1/0967*  (2006.01)
  *H04W 4/02*  (2018.01)
  *H04W 4/029*  (2018.01)
  *H04W 4/12*  (2009.01)
  *H04W 4/40*  (2018.01)
  *H04W 4/42*  (2018.01)

(52) U.S. Cl.
  CPC ............ *H04W 4/025* (2013.01); *H04W 4/12* (2013.01); *H04W 4/40* (2018.02)

(58) Field of Classification Search
  CPC ......... H04W 4/025; H04W 4/12; H04W 4/40; H04W 4/42; H04W 4/029; G06Q 10/063; G06Q 50/10; B62K 11/007; G05D 1/0891
  See application file for complete search history.

(56) References Cited

U.S. PATENT DOCUMENTS

2021/0039642 A1* 2/2021 Nuesch ................ B60W 50/14
2022/0281471 A1   9/2022 Takeuchi et al.

FOREIGN PATENT DOCUMENTS

| JP | 2019-091370 | 6/2019 |
| JP | 2021-033508 | 3/2021 |

* cited by examiner

| USER ID | AUTHENTICATION INFORMATION | | ADDRESS | NAME | AGE | GENDER | TERMINAL INFORMATION | BOARDING-TYPE MOBILE OBJECT INFORMATION | ... |
| --- | --- | --- | --- | --- | --- | --- | --- | --- | --- |
| | PASSWORD | ... | | | | | | | |
| 0001 | *** | ... | *** | AA | 21 | MALE | T111 | V001 | ... |
| 0002 | *** | ... | *** | BB | 10 | FEMALE | T123 | V005 | ... |
| ... | ... | ... | ... | ... | ... | ... | ... | ... | ... |

| EVENT ID | EVENT CONTENT | LOCATION AND ROUTE INFORMATION | PERFORMANCE TIME | ... |
|---|---|---|---|---|
| E001 | AAA PARADE | * * * | * * * | ... |
| E002 | BBB SHOW | * * * | * * * | ... |
| E003 | CCC PARADE | * * * | * * * | ... |
| ... | ... | ... | ... | ... |

| EVENT ID | OPERATION CONTENT | | ADJUSTMENT INFORMATION |
| --- | --- | --- | --- |
| | SINGLE OPERATION | GROUP OPERATION | |
| E001 | ROTATION OPERATION MATCHING MUSIC OF EVENT | ROTATION AT THE SAME TIMING BY GROUP (CONDITION: THREE DEVICES OR MORE) | DECREASING ROTATION SPEED IF USER IS UNDER THE AGE OF 12 |
| E002 | OUTPUTTING VOICE | OUTPUTTING SOUNDS OF DIFFERENT MUSICAL INSTRUMENTS IN GROUP (CONDITION: FIVE DEVICES OR MORE) | |
| | LIGHT EMITTING | EMITTING LIGHT OF THE SAME COLOR BY GROUP (CONDITION: TWO DEVICES OR MORE) | FLASHING IF TIME ZONE IS DAYTIME, AND INCREASING THE AMOUNT OF LIGHT EMISSION IF TIME ZONE IS NIGHTTIME |
| ... | ... | ... | ... |

FIG. 8
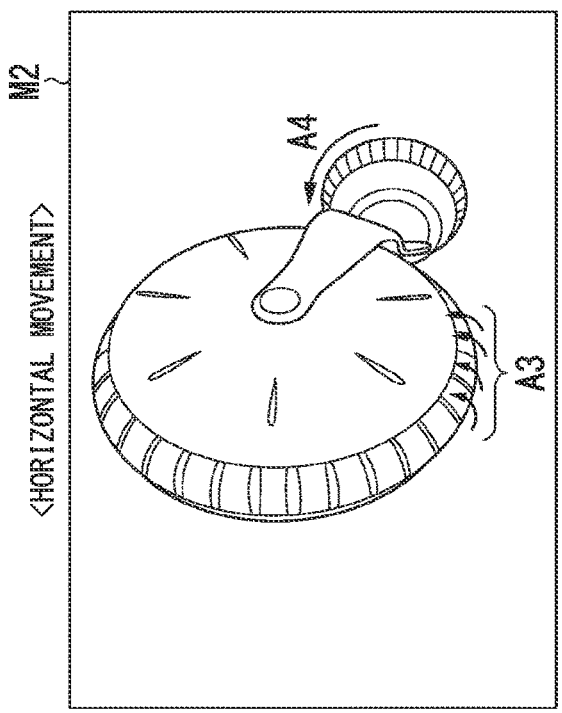
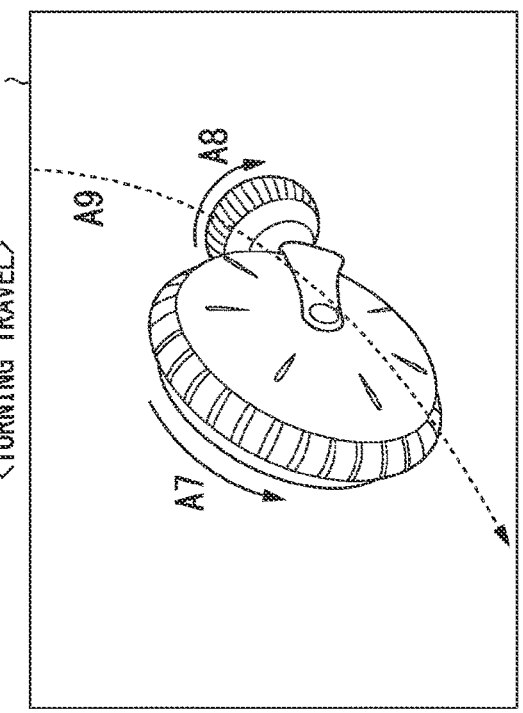
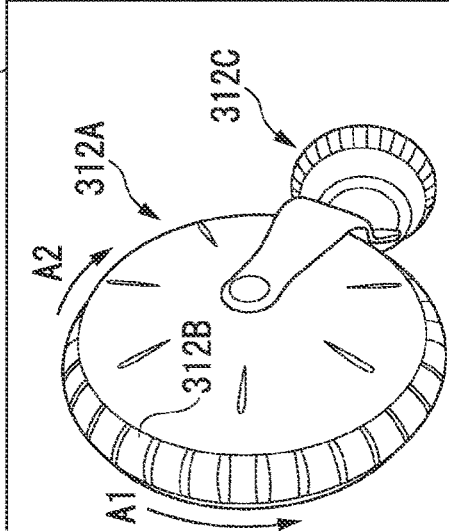
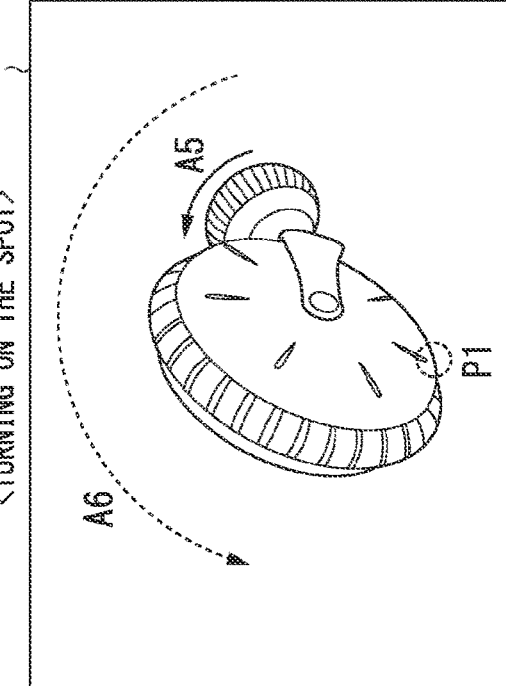

MOBILE OBJECT MANAGEMENT DEVICE, MOBILE OBJECT MANAGEMENT METHOD, AND STORAGE MEDIUM

CROSS-REFERENCE TO RELATED APPLICATION

Priority is claimed on Japanese Patent Application No. 2021-161619, filed Sep. 30, 2021, the content of which is incorporated herein by reference.

BACKGROUND

Field of the Invention

The present invention relates to a mobile object management device, a mobile object management method, and a storage medium.

Description of Related Art

Conventionally, technology in which, when a mobile object parade is held at an amusement park or the like, a command controller remotely controls lighting with which a mobile object is equipped and light-emitting bodies carried by spectators watching the parade is known (for example, Japanese Unexamined Patent Application, First Publication No. 2004-39415).

SUMMARY

However, in the conventional technology, it is necessary to arrange a plurality of pieces of communication equipment for causing the mobile object and the light-emitting body to directly receive command content from the command controller, or a plurality of relay devices for relaying radio waves of a command signal along a parade course, which can lead to increased equipment costs. On the other hand, if the equipment cost is suppressed, there is a possibility that production of the event will not be able to be performed sufficiently.

Aspects of the present invention have been made in consideration of such circumstances, and an object thereof is to provide a mobile object management device, a mobile object management method, and a storage medium that can further improve the production effect of an event while suppressing cost.

The mobile object management device, the mobile object management method, and the storage medium according to the present invention have adopted the following configurations.

(1): A mobile object management device according to one aspect of the present invention is a mobile object management device that manages a boarding-type mobile object that moves within a predetermined area with a user on board, and includes an acquirer configured to acquire positional information of the boarding-type mobile object, a manager configured to manage the boarding-type mobile object and a terminal device of a user on the boarding-type mobile object in association with each other, and an event operation commander configured to cause the boarding-type mobile object to execute a predetermined operation in accordance with an event performed in the predetermined area via the terminal device of the user on the basis of the positional information and information on the event.

(2): In the aspect of (1) described above, the mobile object management device further includes an operation selector configured to select a predetermined operation to be executed by the boarding-type mobile object on the basis of a distance between a point in the predetermined area where the event is performed and the boarding-type mobile object, and a performance time of the event.

(3): In the aspect of (2) described above, the operation selector selects a predetermined operation to be executed by the boarding-type mobile object on the basis of a distance between an object related to the event and the boarding-type mobile object.

(4): In the aspect of (1) described above, the acquirer acquires positional information of a terminal device from the terminal device of a user on the boarding-type mobile object and acquires the acquired positional information as positional information of the boarding-type mobile object.

(5): In the aspect of (1) described above, the event operation commander causes a boarding-type mobile object present within a specific range less than the predetermined area to execute a predetermined operation on the basis of the number of the boarding-type moving bodies present within the specific range.

(6): In the aspect of (1) described above, the event includes a parade or a show that is performed in the predetermined area.

(7): In the aspect of (1) described above, the predetermined operation includes music output in relation to performance of the event, light emission, or an operation matching an operation of an object related to the event.

(8): In the aspect of (1) described above, the predetermined operation includes an operation of outputting sound from an audio output provided in the boarding-type mobile object.

(9): In the aspect of (1) described above, the predetermined operation includes an operation of causing a light emitter provided in the boarding-type mobile object to emit light.

(10): In the aspect of (1) described above, the manager notifies the user of information on conditions under which the predetermined operation is executed for the boarding-type mobile object.

(11): In the aspect of (1) described above, the event operation commander adjusts content of the predetermined operation on the basis of information on a user on the boarding-type mobile object or a surrounding environment of the boarding-type mobile object.

(12): In the aspect of (1) described above, the event operation commander adjusts content of the predetermined operation on the basis of setting content from a user on the boarding-type mobile object.

(13): A mobile object management method according to another aspect of the present invention includes, by a computer of a mobile object management device that manages a boarding-type mobile object moving within a predetermined area with a user on board, acquiring positional information of the boarding-type mobile object, managing the boarding-type mobile object and a terminal device of a user on the boarding-type mobile object in association with each other, and causing the boarding-type mobile object to execute a predetermined operation in accordance with an event performed within the predetermined area via the terminal device of the user on the basis of the positional information and information on the event.

(14): A storage medium according to still another aspect of the present invention is a computer-readable non-transitory storage medium that has stored a program causing a computer of a mobile object management device that manages a boarding-type mobile object moving within a predetermined area with a user on board to acquire positional information of the boarding-type mobile object, manage the boarding-type mobile object and a terminal device of a user on the boarding-type mobile object in association with each other, and cause the boarding-type mobile object to execute a predetermined operation in accordance with an event performed within the predetermined area via the terminal device of the user on the basis of the positional information and information on the event.

According to the above aspects (1) to (14), it is possible to further improve the production effect of an event while suppressing cost.

BRIEF DESCRIPTION OF THE DRAWINGS

FIG. 2 is a diagram for describing content of user information.

FIG. 3 is a diagram for describing content of event information.

FIG. 4 is a diagram for describing content of operation information.

FIG. 8 is a diagram for describing details of an operation of the omnidirectional moving wheel of the boarding-type mobile object.

DESCRIPTION OF EMBODIMENTS

Hereinafter, embodiments of a mobile object management device, a mobile object management method, and a storage medium of the present invention will be described with reference to the drawings. In the following description, a mobile object management system including a boarding-type mobile object that moves within a predetermined area with a user on board and a mobile object management server that manages the boarding-type mobile object will be described. A predetermined area is, for example, an area of a facility having a predetermined size, such as a theme park, a leisure land, an amusement park, a zoo, an aquarium, a shopping mall, or the like. The predetermined area may be an area within a range designated by positional information such as latitude and longitude.

[System Configuration]

Figure 1:
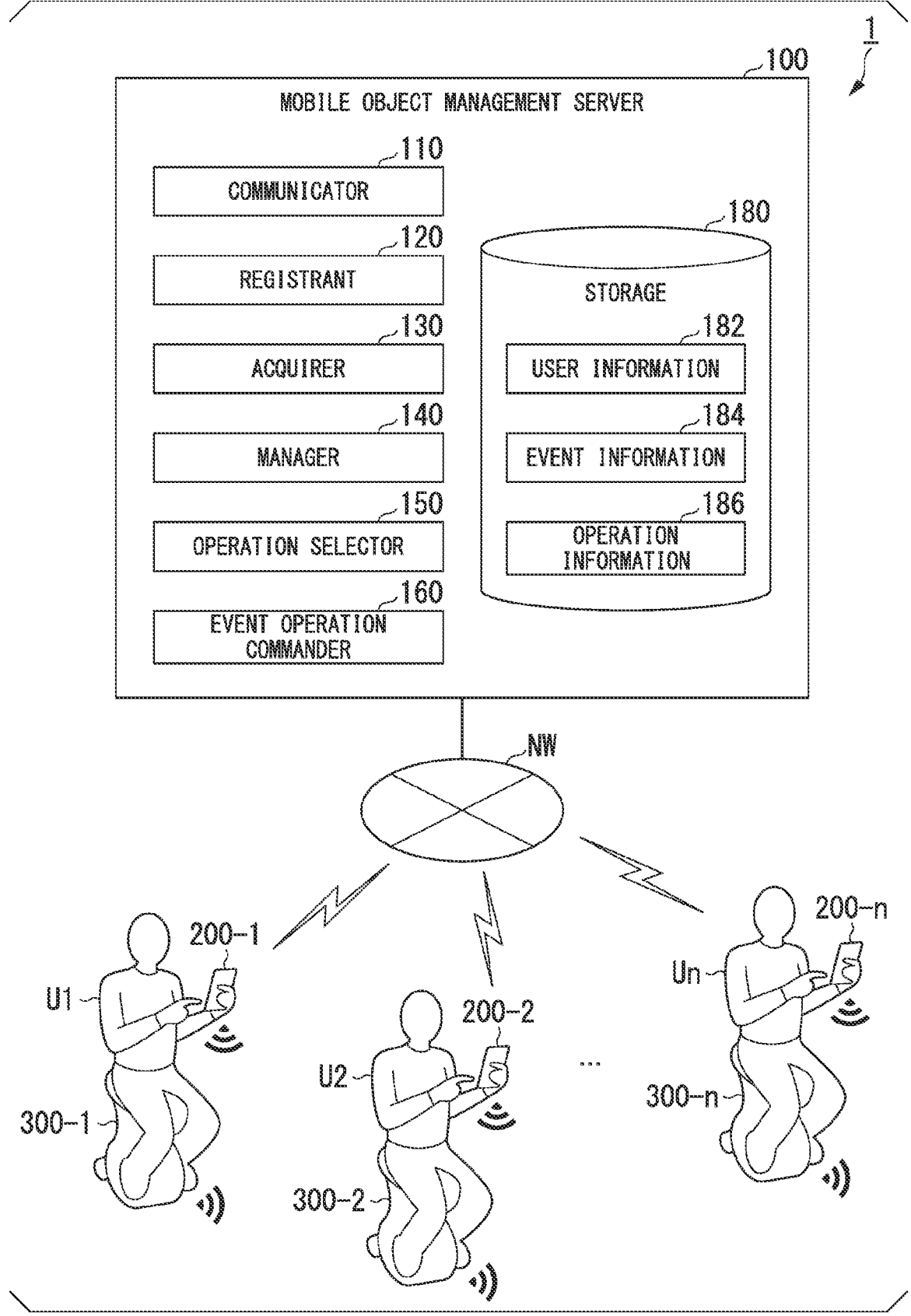
FIG. 1 is a configuration diagram of a mobile object management system according to an embodiment.

FIG. 1 is a configuration diagram of the mobile object management system 1 according to an embodiment. The mobile object management system 1 includes, for example, a mobile object management server 100, terminal devices 200-1 to 200-n of a plurality of users U1 to Un, and boarding-type moving bodies 300-1 to 300-n on which each of the users U1 to Un boards. In the following description, users U1 to Un are simply referred to as "user U" except when each of them is separately described. Similarly, the terminal devices 200-1 to 200-n and the boarding-type moving bodies 300-1 to 300-n are also referred to as "terminal device 200" and "boarding-type mobile object 300" to be described. The mobile object management server 100 and the terminal device 200 can communicate with each other via, for example, a network NW. The network NW includes the Internet, a Wide Area Network (WAN), a Local Area Network (LAN), a telephone line, a public line, a leased line, a provider device, a wireless base station, and the like. The mobile object management server 100 is an example of a "mobile object management device." The terminal device 200 and the boarding-type mobile object 300 can communicate with each other based on, for example, Wi-Fi (registered trademark), Bluetooth (registered trademark), and other short-range wireless communication standards.

The mobile object management server 100 manages the user U who uses the boarding-type mobile object 300 or controls the operation of the boarding-type mobile object 300. The mobile object management server 100 manages the boarding-type mobile object 300 and the terminal device 200 of the user U in association with each other. The terminal device 200 is, for example, a portable terminal that the user U can possess while boarding the boarding-type mobile object 300, specifically a smart phone or a tablet terminal. The terminal device 200 is a terminal device carried by the user U. The boarding-type mobile object 300 is a mobile object that moves within a predetermined area with the user U on board. The boarding-type mobile object 300 is, for example, lent by a service provider in the mobile object management system 1 in order for the user U to move within a predetermined area. For example, the boarding-type mobile object 300 is a vehicle, a micro-mobility, a robot, or the like that can move with the user U sitting on the seat of the boarding-type mobile object 300 or standing on the step. The boarding-type mobile object 300 moves within a predetermined area or executes a predetermined operation with the user U on board on the basis of an operation command based on an operation by the user U or an operation command from the mobile object management server 100. The predetermined operation includes, for example, music output in relation to performance of an event performed in a predetermined area or operations matching the operations of objects related to the event. The predetermined operation may include an operation of outputting sound from an audio output provided on the boarding-type mobile object 300 and an operation of causing a light emitter provided on the boarding-type mobile object 300 to emit light. The event includes, for example, a parade that marches along a predetermined route within a predetermined area at a predetermined time, and a show (for example, an event such as a play, a concert, or the like) performed at a specific location within a predetermined area at a predetermined time. The event may include, for example, an event (group event) that occurs when a predetermined number of boarding-type moving bodies 300 gather within a specific range in a predetermined area. The objects related to an event include, for example, persons participating in the event (mascot characters, musical instrument players, dancers, various casts such as dolls), moving bodies (parade cars, drones), and the like. The user U can use the boarding-type mobile object 300 within a predetermined area by, for example, performing registration processing and the like on the mobile object management server 100 via the terminal device 200. Hereinafter, details of the mobile object management server 100, the terminal device 200, and the boarding-type mobile object 300 will be described below. In the following description, it is assumed that the predetermined area is the theme park.

[Mobile Object Management Server]

The mobile object management server 100 includes, for example, a communicator 110, a registrant 120, an acquirer 130, a manager 140, an operation selector 150, an event operation commander 160, and a storage 180. The registrant 120, the acquirer 130, the manager 140, the operation selector 150, and the event operation commander 160 are realized by, for example, executing a hardware processor program (software) of a central processing unit (CPU). Some or all of these components may be realized by hardware (circuit unit; including circuitry) such as large scale integration (LSI), an application specific integrated circuit (ASIC), a field-programmable gate array (FPGA), a graphics processing unit (GPU), or the like, or may be realized by software and hardware in cooperation. The program may be stored in advance in a storage device such as a hard disk drive (HDD) or flash memory (a storage device having a non-transitory storage medium), or may be stored in a removable storage device (non-transitory storage medium) such as a DVD or CD-ROM and may be installed in the storage device of the mobile object management server 100 by the storage medium being attached to a drive device or the like. The mobile object management server 100 may communicate with, for example, the terminal device 200 via the network NW and function as a cloud server that transmits and receives various data.

The storage 180 may be realized by the various storage devices described above, or a solid-state drive (SSD), an electrically erasable programmable read only memory (EEPROM), a read only memory (ROM), a random access memory (RAM), or the like. The storage 180 stores, for example, user information 182, event information 184, operation information 186, programs, and other various types of information. The storage 180 may store map information of the theme park. Details of the user information 182, the event information 184, and the operation information 186 will be described below.

The communicator 110 communicates with the terminal device 200 and other external devices via the network NW.

The registrant 120 registers information on the user U who uses the mobile object management system 1. Specifically, the registrant 120 receives the information on the user U from the terminal device 200 and stores the received information in the user information 182 of the storage 180.

FIG. 2 is a diagram for describing content of the user information 182. The user information 182 is, for example, information in which address, name, age, sex, terminal information, boarding-type mobile object information, and the like are associated with authentication information for authenticating a user U at the time of using a service of the mobile object management system 1, and the like. The authentication information may include, for example, user ID, password, and the like which are identification information for identifying the user U. The authentication information may include biometric authentication information such as fingerprint information and iris information. The terminal information includes, for example, a terminal ID, a telephone number, an e-mail address, and the like which are identification information for identifying a terminal device 200 carried by the user U within the theme park. The boarding-type mobile object information includes, for example, a mobile object ID which is identification information for identifying a boarding-type mobile object communicating with the terminal device 200 of the user U by a short-distance wireless communication method using Bluetooth or the like. The mobile object management server 100 communicates with the terminal device 200 on the basis of the terminal information, or generates individual operation commands by identifying the boarding-type mobile object 300 on the basis of the boarding-type mobile object information.

For example, when the registrant 120 receives a user registration request from the terminal device 200, it generates an image for inputting various information included in the user information 182, displays it on the terminal device 200 from which the request is received, and acquires user information input from the terminal device 200.

The registrant 120 may perform authentication of the user U who uses the service of the mobile object management system 1 on the basis of the registered user information 182. In this case, the registrant 120 performs the authentication of the user U, for example, at a timing when a service use request is received from the terminal device 200. For example, when the registrant 120 receives a use request, it generates an authentication image for inputting authentication information such as a user ID and a password, displays the generated image on the terminal device 200 from which the request is issued, and, at the same time, determines whether to permit a use of the service (the mobile object management system 1) according to whether authentication information matching the input authentication information is stored by referring to the authentication information of the user information 182 on the basis of the input authentication information input using the displayed image. For example, if the authentication information matching the input authentication information is included in the user information 182, the registrant 120 permits the use of the service, and when the matching information is not included, the registrant 120 refuses the use of the service or perform processing for new registration.

The acquirer 130 acquires information on a boarding-type mobile object 300 on which the user U is boarding. For example, when the terminal device 200 is communicating with the boarding-type mobile object 300 by a short-range communication method such as Bluetooth, the acquirer 130 acquires identification information (a mobile object ID) of the boarding-type mobile object 300 in communication from the terminal device 200, identification information (a terminal ID) of the terminal device 200, and a user ID. Then, the acquirer 130 refers to a user ID of the user information 182 on the basis of the user ID, and stores the terminal ID and the mobile object ID in the terminal information and the boarding-type mobile object information associated with the matching user ID. As a result, the mobile object management server 100 can manage a use status of the boarding-type mobile object 300.

The acquirer 130 acquires information on events performed within the theme park and positional information of the boarding-type mobile object 300. For example, the acquirer 130 acquires the event information 184 stored in advance in the storage 180 as the information on events.

FIG. 3 is a diagram for describing the content of the event information 184. The event information 184 is, for example, information in which content of an event, location/route information, performance time, and the like are associated with an event ID. The event ID is identification information for identifying an event performed within the theme park. The content of an event includes, for example, information such as a title, a type (parade, show), the number of cast members, a music, and participating cast members of an event. The location/route information includes, for example, information on a location in the theme park where the event is held and a route to march in a parade. At least one of the contents of an event and the location/route information includes information related to a music or light emission output in relation to performance of the event, and an operation of an object related to the event (what kind of operation is to be performed at a corresponding point). The performance time may include information on a time zone, day of the week, or a duration in which the event is performed. The event information 184 is, for example, acquired from an external device connected to the network NW, or directly input from the mobile object management server 100 by a server administrator and stored in the storage 180.

For example, the acquirer 130 acquires positional information of the terminal device 200 from the terminal device 200 of the user U who is on the boarding-type mobile object 300 (in other words, the terminal device 200 that is communicating with the boarding-type mobile object 300 according to a short-range wireless communication method), and acquires the acquired positional information as the positional information of the boarding-type mobile object 300. The acquirer 130 repeatedly acquires positional information at predetermined intervals while the terminal device 200 and the boarding-type mobile object 300 are communicating.

On the basis of the user information 182, the manager 140 manages the boarding-type mobile object 300 and the terminal device 200 of the user U on the boarding-type mobile object 300 in association with each other. The manager 140 manages a usage status of the user U and the boarding-type mobile object 300 (for example, which boarding-type mobile object 300 the user U is boarding) on the basis of the user information 182. The manager 140 manages a position of the boarding-type mobile object 300 within the theme park on the basis of the information acquired by the acquirer 130. The manager 140 may transmit information on conditions under which a predetermined operation (event operation) is performed on the boarding-type mobile object 300 according to the performance of the event to the terminal device 200 of the user U and notify the user U of it.

The operation selector 150 selects content of a predetermined operation to be executed by the boarding-type mobile object 300 on the basis of the positional information of the boarding-type mobile object 300 present within the theme park and the information on events performed within the theme park. For example, the operation selector 150 refers to the event information 184 stored in the storage 180, and selects an operation to be executed by the boarding-type mobile object 300 on the basis of a distance between a point where an event is performed (including a position on a route) and the boarding-type mobile object 300, and a performance time of the event.

For example, the operation selector 150 selects a predetermined operation corresponding to a production in accordance with an event to be performed by the boarding-type mobile object 300 when the event is being performed and a distance between a performance point of the event and the boarding-type mobile object 300 is within a predetermined distance. The operation selector 150 may select a predetermined operation to be executed by the boarding-type mobile object 300 when a distance between an object and the boarding-type mobile object 300 is within a predetermined distance on the basis of the distance between the object related to an event and the boarding-type mobile object 300. The operation selector 150 may select an operation for each of the boarding-type moving bodies 300 present within a specified range according to the number of boarding-type moving bodies 300 present within the specified range less than an area of the theme park. The specific range includes, for example, a predetermined zone such as an adventure area or park area present in the theme park, or a range within a predetermined distance centered about an object related to the event. The operation selector 150 may select a predetermined operation to be executed on the basis of a combination of a plurality of various conditions for selecting an operation described above.

When the content of a predetermined operation is specifically selected, the operation selector 150 refers to an event ID of the operation information 186 on the basis of an event ID of a target event that has satisfied conditions in the event information 184, and determines specific content of a predetermined operation executed by a target boarding-type mobile object 300 on the basis of information associated with the matching event ID.

FIG. 4 is a diagram for describing content of the operation information 186. The content included in the operation information includes, for example, music output in relation to performance of an event, light emission, or an operation matching an operation of an object related to the event. The operation information 186 is, for example, information in which operation content and adjustment information are associated with an event ID. For example, the operation content includes operation content (a single operation) when the target boarding-type mobile object 300 is operated alone, and operation content (a group operation) executed by each boarding-type mobile object 300 when there are more than a predetermined number of boarding-type moving bodies 300 in a specific range. In the example of FIG. 4, an operation of rotating the boarding-type mobile object 300 in accordance with music output during an event or outputting sound, or emitting light is shown as the single operation, and when the number of boarding-type moving bodies 300 is equal to or greater than a predetermined number, an operation of rotating the boarding-type moving bodies 300 at the same time in a group, outputting different instrumental sounds, or emitting light of the same color is shown as the group operation. In this manner, even with the same event, it is possible to perform various productions for the user U by selecting a single action and a group operation.

The adjustment information is, for example, information for adjusting some operations set in the operation content according to the information on the user U, a surrounding environment, or the like. The information on the user U is information acquired from the user information 182 (for example, age and sex). Information on the surrounding environment is, for example, information acquired from the event information 184 (for example, location/route information and performance time). In the example of FIG. 4, as the adjustment information, decreasing a rotation speed if a user is under the age of 12, flashing the light emitter if a time zone is daytime (for example, 10:00 to 17:59), and increasing the amount of light emitted by the light emitter if the time zone is nighttime (18:00 to 21:00) are shown. The operation content and the adjustment information are not limited to the example in FIG. 4. In addition, operation information on each of movement (rotation, or the like) of the boarding-type mobile object 300, a voice output, and light emission, or a combination of these may be set for each event.

The event operation commander 160 generates an operation command for an event for the target boarding-type mobile object 300 on the basis of the operation content determined (selected) by the operation selector 150. For example, the event operation commander 160 generates an operation command for causing the boarding-type mobile object 300 within a predetermined distance from a performance point to execute a predetermined event operation at a time when the event is performed. The event operation commander 160 may adjust content of the event operation (including a degree of the operation) on the basis of the adjustment information, and may adjust the content of the event operation on the basis of setting content (the adjustment information) of the user U obtained from the terminal device 200.

The event operation commander 160 acquires terminal information of the terminal device 200 of the user U boarding the target boarding-type mobile object 300 on the basis of terminal information of the user information 182, and transmits the generated or adjusted operation command to the terminal device 200 on the basis of the acquired terminal information. The event operation commander 160 may transmit map information of an area (theme park) and the like to the terminal device 200 in addition to (or instead of) the operation command

[Terminal Device]

Figure 5:
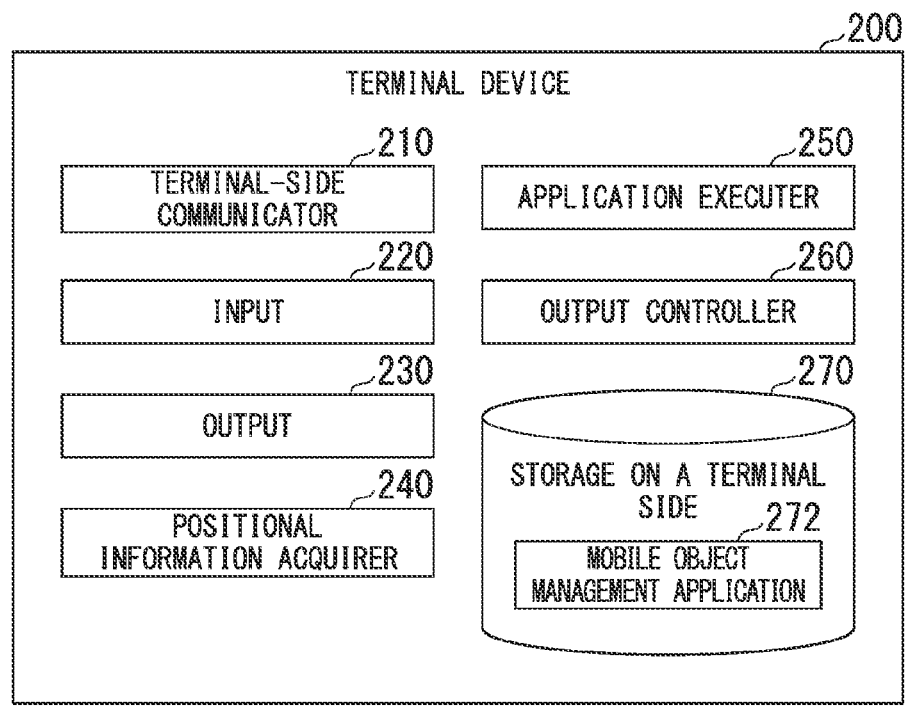
FIG. 5 is a configuration diagram of a terminal device of the embodiment.

Next, a configuration of the terminal device 200 will be described. FIG. 5 is a configuration diagram of the terminal device 200 of the embodiment. The terminal device 200 includes, for example, a terminal-side communicator 210, an input 220, an output 230, a positional information acquirer 240, an application executer 250, an output controller 260, and a terminal-side storage 270. The positional information acquirer 240, the application executer 250, and the output controller 260 are realized by, for example, executing a hardware processor program (software) of a CPU or the like. Some or all of these components may be realized by hardware (a circuit unit; including circuitry) such as LSI, an ASIC, an FPGA, a GPU, or the like, or may be realized by software and hardware in cooperation. The program may be stored in advance in a storage device (a storage device having a non-transitory storage medium) such as an HDD or flash memory, or may be stored in a removable storage medium (a non-transitory storage medium) such as a DVD or CD-ROM and installed in the storage device of the terminal device 200 by the storage medium being attached to a drive device, a card slot, or the like.

The terminal-side storage 270 may be realized by the various storage devices described above, an EEPROM, a ROM, a RAM, or the like. The terminal-side storage 270 stores, for example, a mobile object management application 272, a program, and various other types of information. The terminal-side storage 270 may store user information such as terminal IDs and user IDs, or may store map information obtained from the mobile object management server 100 or the like.

The terminal-side communicator 210 uses, for example, the network NW to communicate with the mobile object management server 100, the boarding-type mobile object 300, and other external devices. The terminal-side communicator 210 may also include a short-range communication function of performing wireless communication on the basis of, for example, Wi-Fi, Bluetooth, Dedicated Short Range Communication (DSRC), and other communication standards or executing short-range communication with the boarding-type mobile object 300 (NFC (Near Field Communication).

The input 220 receives, for example, an input of the user U through operation of various keys and buttons. The input 220 includes a voice input such as a microphone, and may receive a voice of the user U and nearby sounds of the terminal device 200 through the voice input. The output 230 outputs information to the user U. The output 230 is, for example, a display (display) or a speaker (audio output). The display is, for example, a liquid crystal display (LCD) or an organic electro luminescence (EL) display. The input 220 may be configured integrally with the display as a touch panel. The display displays various types of information in the embodiment under control of the output controller 260. The speaker outputs, for example, predetermined sounds (voice, music, warning sounds, sound effects, or the like) under the control of the output controller 260.

The positional information acquirer 240 acquires the positional information of the terminal device 200 by, for example, an embedded Global Positioning System (GPS) device (not shown). The positional information includes, for example, latitude and longitude.

The application executer 250 is realized by executing the mobile object management application 272 stored in the terminal-side storage 270. The mobile object management application 272 which is, for example, downloaded from an external device via the network NW is installed in the terminal device 200. The mobile object management application 272 is an application program that controls the output controller 260 such that the display outputs an image provided by the mobile object management server 100 or the speaker outputs a voice corresponding to information provided by the mobile object management server 100 to the user U.

The application executer 250 transmits the information received by the input 220, the information stored in the terminal-side storage 270, and the like to the mobile object management server 100 and the boarding-type mobile object 300 via the terminal-side communicator 210. The information received by the input 220 includes, for example, information on registration and authentication of the user U, adjustment information of the operation of the user U when the boarding-type mobile object 300 operates according to an event, and the like. The application executer 250 transmits information obtained from the mobile object management server 100, positional information of the terminal device 200, map information, and the like to the boarding-type mobile object 300 that the user U is on, or transmits information obtained from the boarding-type mobile object 300 together with a user ID and positional information to the mobile object management server 100.

The output controller 260 controls content and a display mode of an image displayed on the display of the output 230, and content and an output mode of audio output by a speaker under control of the application executer 250.

[Boarding-Type Mobile Object]

Figure 6:
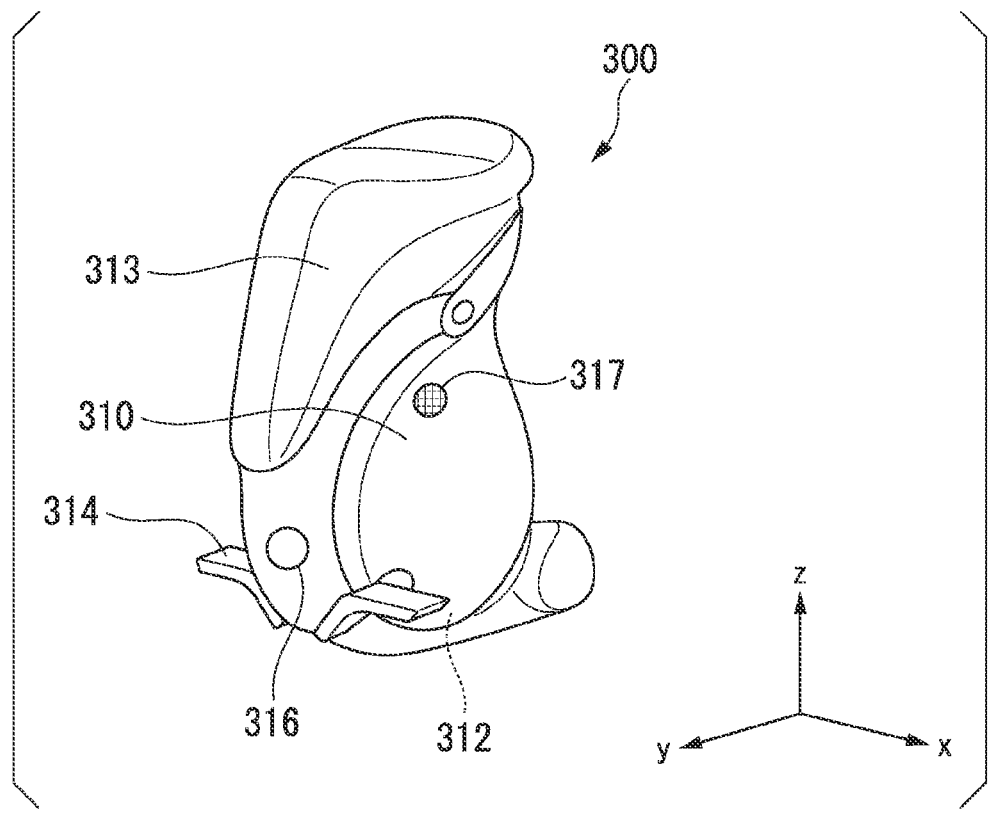
FIG. 6 is a perspective diagram which shows an appearance of a boarding-type mobile object of the embodiment.

Next, the boarding-type mobile object 300 will be described. FIG. 6 is a perspective view which shows an appearance of the boarding-type mobile object 300 of the embodiment. In FIG. 6, a width direction of the boarding-type mobile object 300 is referred to as an x direction, a front-rear direction is referred to as a y direction, and a vertical direction is referred to as a z direction. A forward direction of the boarding-type mobile object 300 is a positive direction of the y axis (a direction from a back side of the paper to a front side of the paper, hereinafter referred to as a +y-axis direction), and a backward direction is a negative direction of the y axis (a direction from the front side of the paper to the back side of the paper, hereinafter referred to as a −y-axis direction).

The boarding-type mobile object 300 shown in FIG. 6 includes, for example, a substrate 310, an omnidirectional moving wheel 312, a seat 313, and a step 314. The inside of the substrate 310 is covered with, for example, a cover panel made of a resin. A configuration of the inside of the substrate 310 will be described below.

Figure 7:
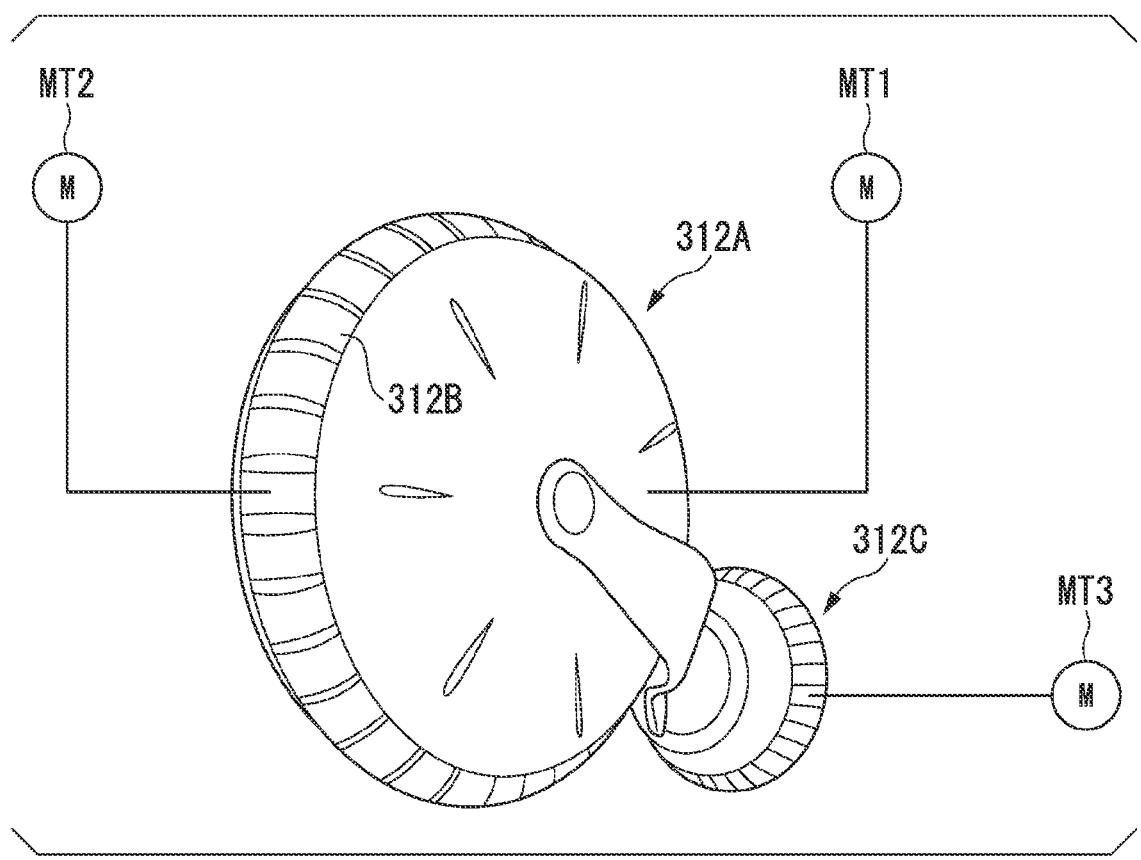
FIG. 7 is a perspective view of an omnidirectional moving wheel.

FIG. 7 is a perspective view of the omnidirectional moving wheel 312. The omnidirectional moving wheel 312 includes a large-diameter wheel 312A, a small-diameter wheel 312B, a turning wheel 312C, a first motor MT1, a second motor MT2, and a third motor MT3. The large-diameter wheel 312A is a wheel that can rotate around an x axis. The large-diameter wheel 312A is rotated by the first motor MT1.

The small-diameter wheel 312B is a wheel rotatable around an axis perpendicular to a straight line in a radial direction in a widthwise central section of the large-diameter wheel 312A. The omnidirectional moving wheel 312 includes a plurality of small-diameter wheels 312B. The plurality of small-diameter wheels 312B are arranged at approximately equal intervals in a circumferential direction of the large-diameter wheel 312A. The plurality of small-diameter wheels 312B are all rotated together by the second motor MT2.

The turning wheel 312C is a wheel that can rotate around the y axis. The turning wheel 312C has a smaller diameter than the large-diameter wheel 312A. The turning wheel 312C is rotated by the third motor MT3. The omnidirectional moving wheel 312 moves the boarding-type mobile object 300 by rotating at least one of the large-diameter wheel 312A, the small-diameter wheel 312B, and the turning wheel 312C. Details of the operation of the omnidirectional moving wheel 312 will be described below.

The seat 313 is attached above the substrate 310. The seat 313 is a member on which the user U on the boarding-type mobile object 300 sits. The step 314 is attached to a lower front portion of the substrate 310. The step 314 is a member on which the user U places a leg. The seat 313 and the step 314 are adjustable in width and height.

The boarding-type mobile object 300 may include a light emitter 316 such as a lamp, a speaker 317 for outputting voice, and the like. The light emitter 316 can light or flash in one or more predetermined colors. The speaker 317 outputs a predetermined sound (voice, music, a warning sound, a sound effect, or the like). One or more of the light emitter 316 and the speaker 317 may be attached to arbitrary places on the boarding-type mobile object 300, and the attachment positions are not limited to those shown in FIG. 6.

Next, the details of the operation of the omnidirectional moving wheel 312 of the boarding-type mobile object 300 will be described. FIG. 8 is a diagram for describing the details of the operation of the omnidirectional moving wheel 312 of the boarding-type mobile object 300. The omnidirectional moving wheel 312 is a wheel that enables the boarding-type mobile object 300 to immediately advance in any direction (all directions of 360 degrees) from a current position without performing a preliminary operation such as turning. The omnidirectional moving wheel 312 includes, for example, a large-diameter wheel 312A as a front wheel and a turning wheel 312C as a rear wheel, and includes the plurality of small-diameter wheels 312B on a grounding portion (an edge portion in a radial direction) of the front large-diameter wheel 312A.

The large-diameter wheel 312A is a wheel that mainly realizes straight advancing movement in a forward and backward direction. The small-diameter wheel 312B is a wheel that mainly realizes horizontal movement on the spot by rotating in a rotational direction (a circumferential direction) of the large-diameter wheel 312A. On the other hand, the rear turning wheel 312C has a smaller diameter than the large-diameter wheel 312A, and is a wheel that mainly realizes a turning movement by rotating on a rotation axis orthogonal to a rotation axis of the large-diameter wheel 312A.

The omnidirectional moving wheel 312 includes motors MT1 to MT3 capable of independently controlling the rotation of the large-diameter wheel 312A, the small-diameter wheel 312B, and the turning wheel 312C described above. With such a configuration, the omnidirectional moving wheel 312, in addition to moving back and forth, can not only move in various directions, such as horizontally or diagonally, but also realize agile movement such as bending or turning on the spot by using a difference in movement speed between the front and rear wheels in a lateral direction.

Here, the forward direction of the boarding-type mobile object 300 is a positive direction of the y axis (a direction from the back side of the paper to the front side of the paper, hereinafter referred to as a +y-axis direction) in FIG. 8, and the backward direction is a negative direction of the y axis (a direction from the front side of the paper to the back side of the paper, hereinafter referred to as a −y-axis direction). For example, as shown in an operation example M1 (moving forward/moving backward) in FIG. 8, the omnidirectional moving wheel 312 moves forward by rotating the large-diameter wheel 312A in a direction of an arrow A1 and moves backward by rotating in a direction of an arrow A2.

As shown in an operation example M2 (horizontal movement) in FIG. 8, the omnidirectional moving wheel 312 can move left on the spot without changing its direction by rotating the small-diameter wheel 312B in a direction of an arrow A3. In this case, the turning wheel 312C may be configured to naturally rotate in a direction of an arrow A4 according to movement in a left-right direction, or may be controlled to rotate in the direction of arrow A4 according to the amount of rotation of the small-diameter wheel 312B. The omnidirectional moving wheel 312 can move right on the spot without changing its direction by rotating the small-diameter wheel 312B in a direction opposite to that of the arrow A3. The left direction here is the left direction in FIG. 6 and corresponds to a negative direction of the x axis (a −x-axis direction), and the right direction is the right direction in FIG. 6 and corresponds to a positive direction of the x axis (a +x-axis direction). The plurality of small-diameter wheels 312B may be configured so that all the wheels rotate simultaneously, or may also be configured so that only wheels on the ground rotate.

As shown in an operation example M3 (pivot turning) in FIG. 8, the omnidirectional moving wheel 312 can turn on the spot in a direction of an arrow A6 around a grounding point P1 of the large-diameter wheel 312A by rotating the turning wheel 312C in a direction of an arrow A5, and can turn on the spot in a direction opposite to the arrow A6 by rotating it in a direction opposite to the arrow A5.

As shown in an operation example M4 (turning travel) in FIG. 8, the omnidirectional moving wheel 312 can move forward while turning in a direction of an arrow A9 (turning travel) by rotating the large-diameter wheel 312A in a direction of an arrow A7 and rotating the turning wheel 312C in a direction of an arrow A8. The omnidirectional moving wheel 312 can move backward while turning in an opposite direction of the arrow A9 by rotating the large-diameter wheel 312A in a direction opposite to the arrow A7 and rotating the turning wheel 312C in the direction of the arrow A8. In this example, the omnidirectional moving wheel 312 can move forward or backward while keeping the turning center on the right side by rotating the turning wheel 312C in a direction opposite to the arrow A8.

A method of realizing the omnidirectional moving wheel 312 is not limited to the method of FIG. 8. The omnidirectional moving wheel 312 may be realized using any existing technology. The boarding-type mobile object 300 may include one omnidirectional moving wheel 312 or a plurality of omnidirectional moving wheels 312. Furthermore, the boarding-type mobile object 300 may include normal wheels as auxiliary wheels in addition to the omnidirectional moving wheels 312.

Figure 9:
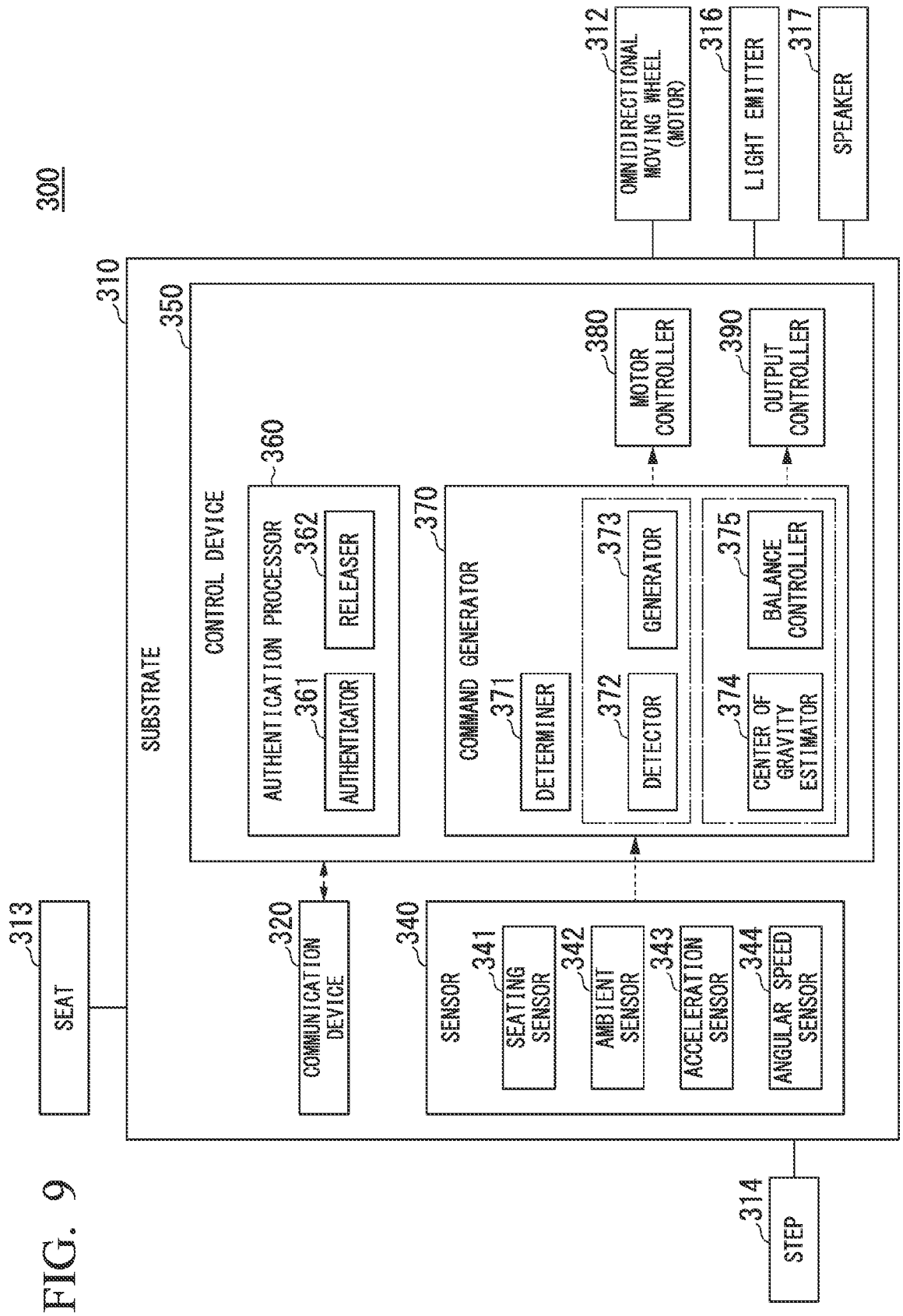
FIG. 9 is a configuration diagram which shows an example of the boarding-type mobile object of the embodiment.

Next, a functional configuration of the boarding-type mobile object 300 will be described. FIG. 9 is a configuration diagram which shows an example of the boarding-type mobile object 300 of the embodiment. The boarding-type mobile object 300 shown in FIG. 9 includes, for example, a communication device 320, a sensor 340, and a control device 350. The communication device 320, the sensor 340, and the control device 350 are provided, for example, in the substrate 310. The boarding-type mobile object 300 includes, in addition to the substrate 310, for example, the omnidirectional moving wheel 312, the seat 313, the step 314, the light emitter 316, and the speaker 317.

The communication device 320 performs wireless communication on the basis of, for example, Wi-Fi, Bluetooth, DSRC, and other communication standards. The communication device 320 receives electrical signals transmitted by the terminal device 200 and outputs them to the control device 350. The communication device 320 transmits electrical signals output by the control device 350 to the terminal device 200. Instead of (or in addition to) the communication device 320, a near field communication function for executing near field communication (NFC) with the terminal device 200 may be provided.

The sensor 340 includes, for example, a seating sensor 341, an ambient sensor 342, an acceleration sensor 343, and an angular speed sensor 344. The seating sensor 341 detects a seating state of whether the user U (a boarding person) is seated in the seat 313. The seating sensor 341 outputs a seating signal indicating the seating state of the user U to the control device 350.

The ambient sensor 342 is a sensor that detects an object around the boarding-type mobile object 300. The ambient sensor 342 detects, for example, a distance between a detected object and the boarding-type mobile object 300. The ambient sensor 342 outputs an ambient object signal regarding the distance between a detected object and the boarding-type mobile object 300 of the detected object to the control device 350. The ambient sensor 342 may be, for example, an ultrasonic sensor using ultrasonic waves as a medium, a light sensor using light as a medium, or an image sensor that captures an image around the boarding-type mobile object 300.

The acceleration sensor 343 is attached to one or more arbitrary places of the substrate 310 or the seat 313. The acceleration sensor 343 detects acceleration acting on the attachment place and outputs it to the control device 350. The angular speed sensor (gyro sensor) 344 is attached to any one or more places of the substrate 310 or the seat 313. The angular speed sensor 344 detects an angular speed acting on the attachment place and outputs it to the control device 350.

The control device 350 controls the operation of the boarding-type mobile object 300 on the basis of information obtained from the communication device 320 and the sensor 340. The control device 350 includes, for example, an authentication processor 360, a command generator 370, a motor controller 380 and an output controller 390. The authentication processor 360 includes, for example, an authenticator 361 and a releaser 362. The command generator 370 includes, for example, a determiner 371, a detector 372, a generator 373, a center of gravity estimator 374, and a balance controller 375.

These components are realized by, for example, executing a hardware processor program (software) of a CPU or the like. Some or all of these components may be realized by hardware (circuit unit; including circuitry) such as LSI, an ASIC, an FPGA, a GPU, and the like, or may be realized by software and hardware in cooperation. The program may be stored in advance in a storage device (a storage device with a non-transitory storage medium) such as an HDD or a flash memory provided in the boarding-type mobile object 300, or may be stored in a removable storage medium (non-transitory storage medium) such as a DVD or a CD-ROM and installed in the storage device by the storage medium being attached to a drive device. The storage device may store a mobile object ID assigned to a host vehicle, a terminal ID obtained from the terminal device 200, positional information, map information, an operation command, and the like.

The authenticator 361 authenticates the user U boarding (or is boarding) the boarding-type mobile object 300. The authenticator 361 performs short-range communication with the terminal device 200 that is present in the vicinity (within a predetermined distance) by using Bluetooth or the like, acquires information on the terminal device 200 (for example, a terminal ID and a user ID) using the terminal device 200 with which communication is first established or the closest terminal device 200, and sets an usage right for the user U possessing the terminal device 200 on the basis of the acquired information. The authenticator 361 may perform the authentication described above, for example, when the seating sensor 341 determines that the user U is seated in the seat 313. The authenticator 361 is in a state of communicating with the terminal device 200 and the boarding-type mobile object 300 when the usage right is set. The authenticator 361 does not communicate with other terminal devices 200 (that is, the usage right is not simultaneously set for a plurality of users) when the usage right is set for one user U (when the usage right is not released).

The releaser 362 measures an elapsed time after the user U leaves the boarding-type mobile object 300. The releaser 362 releases the usage right for the boarding-type mobile object 300 from the user U on the assumption that a release condition is satisfied after a predetermined time has elapsed since the user U left the boarding-type mobile object 300. The predetermined time may be constant or may vary depending on specific conditions. The specific conditions may be, for example, a stop position of the boarding-type mobile object 300, a time zone, the number of people who have visited a specific area with the user U, relationships among family members, friends, and the like. The release condition may be any other condition. For example, the release condition may be that the user U performs an operation indicating an intention to release the usage right and the releaser 362 acquires a signal corresponding to the operation.

The command generator 370 generates, for example, commands of operation control and output control for the boarding-type mobile object 300. The determiner 371 determines whether the user U is seated on the basis of a seating signal output from the seating sensor 341. The determiner 371 determines that the user U has left the boarding-type mobile object 300 when it is determined that the user U is not seated on the seat 313 after determining that the user U is seated on the seat 313 according to the seating signal.

The detector 372 detects content of the operation of the user U with respect to the boarding-type mobile object 300 and information on an event acquired from the terminal device 200 (event operation command) The detector 372 may detect surrounding conditions of the boarding-type mobile object 300 detected by the ambient sensor 342. The surrounding conditions are, for example, behaviors of other boarding-type moving bodies 300 existing in the surroundings, and characters and vehicles performing a parade or the like.

The generator 373 generates an event operation command for the boarding-type mobile object 300. For example, the generator 373 generates, for example, an event operation command corresponding to an event such as a parade or a show performed in the vicinity on the basis of the event operation command generated by the mobile object management server 100, acquired via the terminal device 200. The generated event operation command is, for example, a command for driving, by the motor controller 380, the omnidirectional moving wheel 312, causing, by the output controller 390, the light emitter 316 to light or flash a predetermined color, or outputting a predetermined sound from a speaker (an audio output) according to an operation command from the mobile object management server 100. The generator 373 may generate an operation command to move the boarding-type mobile object 300 such that it is not in contact with surrounding objects obtained from the ambient sensor 342. The generator 373 outputs control information based on the generated operation command (including the event operation command) to the motor controller 380 and the output controller 390.

The center of gravity estimator 374 and the balance controller 375 function mainly when the user U is boarding the boarding-type mobile object 300. The center of gravity estimator 374 estimates a center of gravity of an object including the user U boarding on the boarding-type mobile object 300, the substrate 310, and the seat 313 on the basis of outputs of the acceleration sensor 343 and the angular speed sensor 344.

The balance controller 375 generates control information (an operation command) in a direction of returning a position of the center of gravity estimated by the center of gravity estimator 374 to a reference position (the position of the center of gravity in a stationary state). For example, when the position of the center of gravity is biased to the rear right of the reference position, the balance controller 375 generates information indicating acceleration toward the rear right as control information. If an operation of the user U is acceleration forward and the position of the center of gravity is behind the reference position, the balance controller 375 may suppress acceleration such that the position of the center of gravity is not biased further to the rear due to the acceleration forward, and may also retreat once and start the accelerating forward after guiding the position of the center of gravity forward. The command generator 370 outputs control information (an operation command) generated by the balance controller 375 to the motor controller 380.

The motor controller 380 individually controls each motor attached to the omnidirectional moving wheel 312 on the basis of the control information output by the command generator 370. For example, the motor controller 380 may also execute different controls depending on whether the user U is boarding (seating) the boarding-type mobile object 300 and when not boarding.

When the user U is boarding the boarding-type mobile object 300, under such control, the user U boarding the boarding-type mobile object 300 can move the boarding-type mobile object 300 in a desired direction by moving the center of gravity in the desired direction according to change of his or her posture. That is, the boarding-type mobile object 300 recognizes movement of the center of gravity by the user U as a steering operation of the boarding-type mobile object 300, and performs a movement operation according to the steering operation.

On the basis of the control information output by the command generator 370, the output controller 390 causes the light emitter 316 to light or flash in a predetermined color, and causes the speaker 317 to output a predetermined sound (voice, music, warning sound, effect sound, or the like).

Functions executed by the boarding-type mobile object 300 are executed by power supplied from an internally mounted battery (not shown). The battery may be charged by a charging device provided outside the boarding-type mobile object 300, or may be detachable so that it can be replaced with another battery. The battery can also charge electricity regenerated by a motor of the omnidirectional moving wheel 312.

[Processing Executed by Mobile Object Management System]

Figure 10:
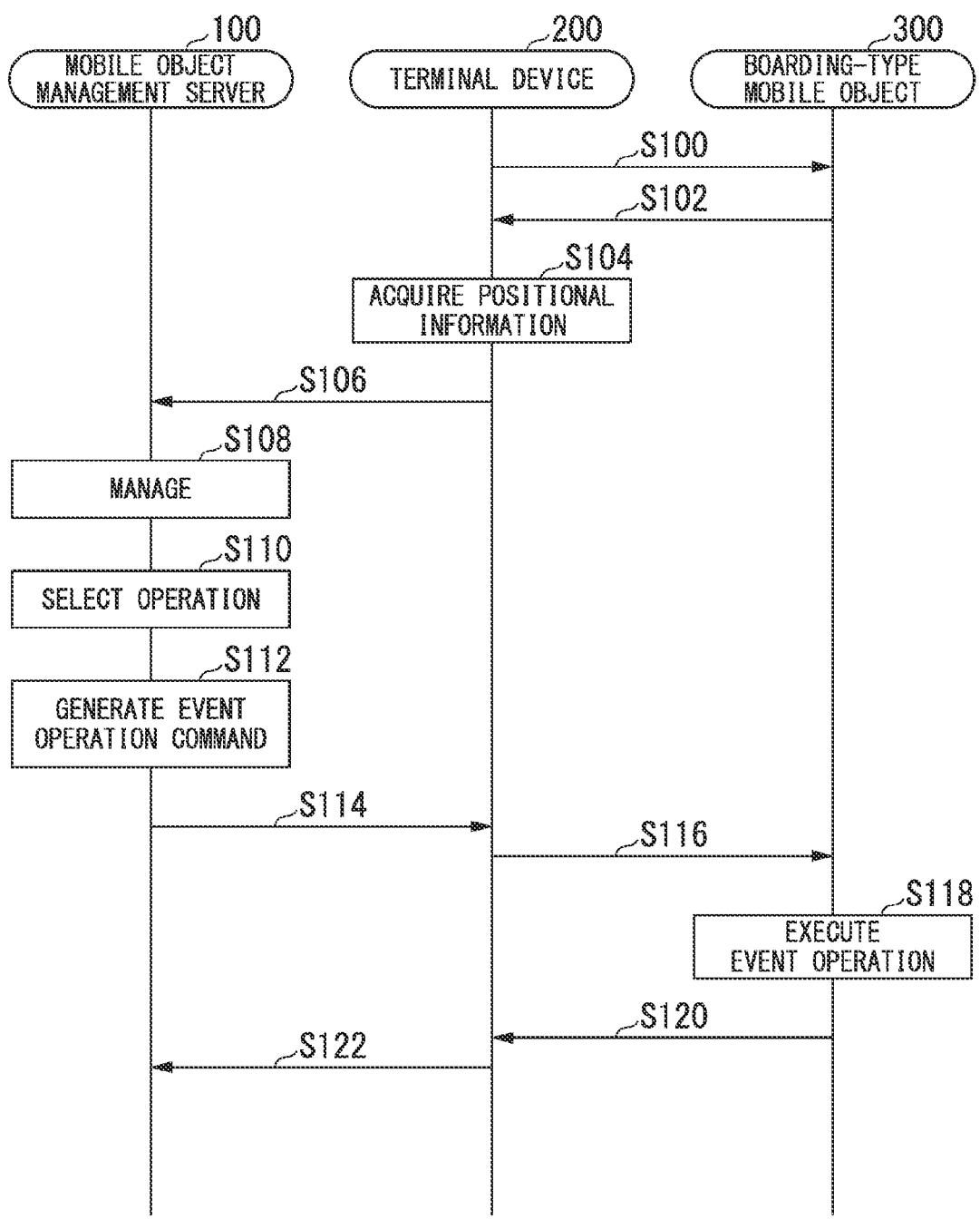
FIG. 10 is a sequence diagram which shows an example of processing executed by the mobile object management system.

Next, processing executed by the mobile object management system 1 will be described. FIG. 10 is a sequence diagram which shows an example of processing to be executed by the mobile object management system 1. In the example of FIG. 10, one mobile object management server 100, the terminal device 200, and the boarding-type mobile object 300 are used for convenience of description. In the example of FIG. 10, an example in which the boarding-type mobile object 300 operates in response to an event performed within a predetermined area will be mainly described. In the example of FIG. 10, it is assumed that authentication processing is performed between the terminal device 200 and the mobile object management server 100, and the user U of the terminal device 200 is permitted to use service provided by the mobile object management system 1.

In the example of FIG. 10, when the user U has boarded the boarding-type mobile object 300, the terminal device 200 communicates with the boarding-type mobile object 300 by a short-range communication method using Bluetooth or the like (step S100), and acquires the identification information (mobile object ID) of the boarding-type mobile object 300 when the use of the boarding-type mobile object 300 is permitted (communication is established) (step S102). Next, the positional information acquirer 240 of the terminal device 200 acquires positional information of the terminal device 200 (step S104). Next, the terminal device 200 transmits the acquired positional information, a terminal ID, and a mobile object ID to the mobile object management server 100 (step S106). The mobile object management server 100 manages the positional information of the terminal device 200 acquired by the terminal device 200 as positional information of the boarding-type mobile object 300 (step S108). The processing of steps S104 to S108 may be repeatedly executed at predetermined intervals while the terminal device 200 and the boarding-type mobile object 300 are connected by short-range communication.

Next, the mobile object management server 100 refers to the event information 184 on the basis of the positional information of the boarding-type mobile object 300, and selects operation content to be executed by the boarding-type mobile object 300 on the basis of content of an event executed within a predetermined distance from the boarding-type mobile object 300 (step S110).

Next, the mobile object management server 100 generates an operation command for causing the boarding-type mobile object 300 to execute the selected operation content (step S112), and transmits the generated operation command to the terminal device 200 (step S114). The terminal device 200 transmits the operation command transmitted from the mobile object management server 100 to the boarding-type mobile object 300 (step S116).

The boarding-type mobile object 300 executes an operation in an operation mode and an output mode based on the event operation command obtained from the terminal device 200 (step S118). A result of the execution is transmitted to the terminal device 200 (step S120). The terminal device 200 transmits the result of the execution transmitted from the boarding-type mobile object 300 to the mobile object management server 100 (step S122). This completes processing of this sequence. According to the processing described above, the mobile object management server 100 can manage the operation mode and the output mode of the boarding-type mobile object 300.

[Specific Example of Service Provided by Mobile Object Management System]

Figure 11:
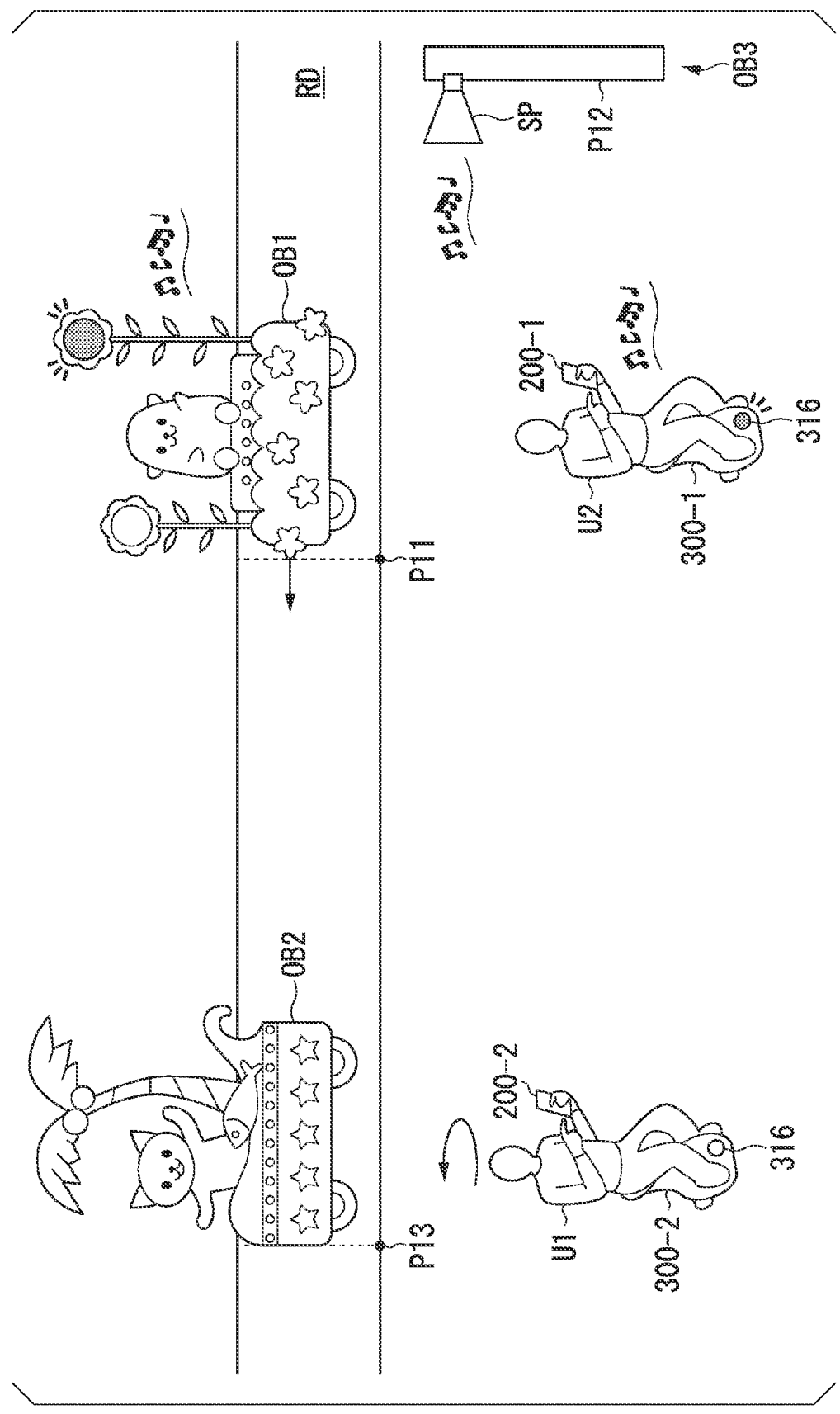
FIG. 11 is a diagram which shows a specific example of mobile object management of the boarding-type mobile object.

A specific example of the service provided by the mobile object management system 1 will be described below. FIG. 11 is a diagram which shows a specific example of mobile object management of the boarding-type mobile object 300. In the example of FIG. 11, objects OB1 and OB2 that parade on a road RD in a facility are shown. The objects OB1 and OB2 are examples of objects related to an event, more specifically parade cars.

On the basis of the event information 184, the manager 140 of the mobile object management server 100 manages objects passing each point at a corresponding time, and the operation mode and the output mode executed by each object. In the example of FIG. 11, it is shown that a production of emitting light and outputting music at the same time is performed when an object OB1 has reached a point P11 on the road RD, and a production of rotating in a predetermined direction is performed when an object OB2 has reached a point P13 on the road RD. In this case, the mobile object management server 100 causes the boarding-type mobile object 300 in the vicinity of the objects OB1 and OB2 to execute operations and outputs based on the operation modes and the output modes of the objects OB1 and OB2 on the basis of the operation modes and the output modes of the objects OB1 and OB2.

Specifically, the operation selector 150 acquires the positional information of the terminal device 200 carried by the user U who is boarding the boarding-type mobile object 300, determines whether the obtained positional information and positions where the objects OB1 and OB2 execute predetermined operations and outputs are within a predetermined distance, and selects processing to be executed on the boarding-type mobile object 300 when they are within the predetermined distance. Then, the event operation commander 160 generates an event operation command based on the selected operation and transmits the generated event operation command to the terminal device 200. The terminal device 200 transmits the event operation command to the boarding-type mobile object 300 connected by short range communication.

As a result, the boarding-type mobile object 300 can be operated in accordance with the operation and output of the objects OB1 and OB2 in the event. In the example of FIG. 11, when music is played at the time when the object OB1 in the parade has reached the point P11 of the road RD, the same music is output from the speaker 317 of the boarding-type mobile object 300-1. When the boarding-type mobile object 300-1 is present within a predetermined distance from the point P12 where an installed speaker SP is present in the facility, at a timing when a sound is output from the installed speaker SP, a similar sound may be output from the speaker 317 of the boarding-type mobile object 300.

In the example of FIG. 11, when light of a predetermined color is emitted at a timing when the object OB1 in the parade has reached the point P11 of the road RD, the light emitter 316 of the boarding-type mobile object 300-1 emits the same color.

In the example of FIG. 11, when the object OB2 in the parade rotates in a predetermined direction at a timing when it has reached a point P13 on the road RD, a boarding-type mobile object 300-2 is also rotated in the predetermined direction. As a result, it is possible to allow the user to experience a production with a sense of unity with the parade.

In the example described above, the mobile object management server 100 has selected the operation content on the basis of a distance of the boarding-type mobile object 300 from the points P11 to P13 in the area, but instead of (or in addition to) this, when the distance from the objects OB1 and OB2 is within a predetermined distance, the boarding-type mobile object 300 may be caused to perform similar operations to the production operations performed by the objects OB1 and OB2. As a result, the boarding-type mobile object 300 can perform the same productions while following the objects OB1 and OB2.

When the manager 140 acquires a mobile object ID and a user ID from the terminal device 200 (for example, when managed by step S108 shown in FIG. 11), it may generate information (for example, images, voice, and the like) on an event to be executed in the area, and provide the generated information to the terminal device 200 to notify the user U of the information. The information on the event includes, for example, information on conditions under which a predetermined operation is executed on the boarding-type mobile object 300 according to the performance of the event.

Figure 12:
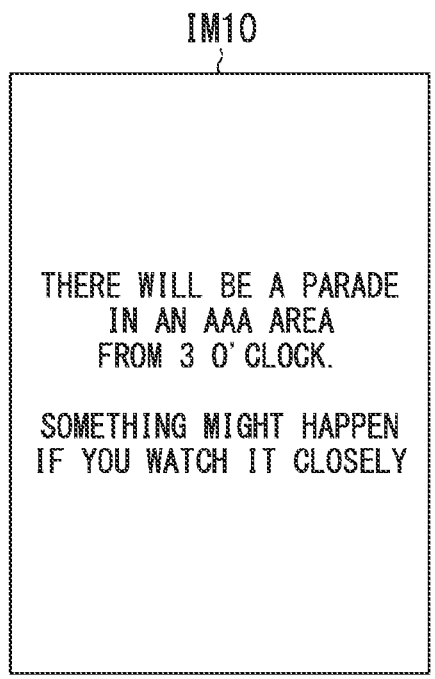
FIG. 12 is a diagram which shows an example of an image regarding an event displayed on a display of a terminal device.

FIG. 12 is a diagram which shows an example of an image IM10 regarding an event displayed on a display of the terminal device 200. The image IM10 shown in FIG. 12 includes, for example, information on a time and a place where the event will be held, and information indicating that some production will be done by watching closely at the event. In the example of FIG. 12, the image IM10 displays character information "There will be a parade in an AAA area from 3 o'clock. Something might happen if you watch it closely." As a result, the user U can know not only a time and a place where the parade will be held, but also that some production will occur by moving with the boarding-type mobile object 300. In addition to displaying the image IM10, the manager 140 may acquire a route from a current position of the boarding-type mobile object 300 to the AAA area from map information stored in the storage 180, and display the acquired route on the display of the terminal device 200.

The manager 140 may generate information to inquire to the user U whether to execute production matching the parade and transmit the generation information to the terminal device 200 of the user U on the boarding-type mobile object 300 present within a predetermined distance from the place where the event is performed at the time when the event is performed to notify the user U.

Figure 13:
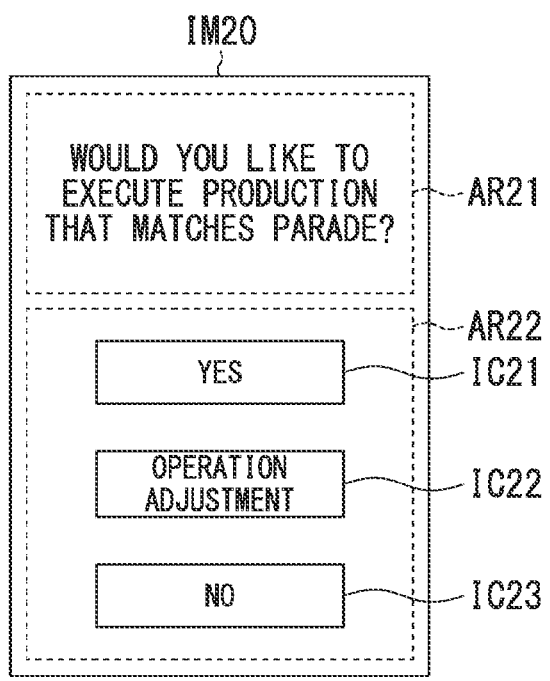
FIG. 13 is a diagram which shows an example of an inquiry image displayed on the display of the terminal device.

FIG. 13 is a diagram which shows an example of the inquiry image IM20 displayed on the display of the terminal device 200. The inquiry image IM20 shown in FIG. 13 includes, for example, an inquiry display area AR21 and a switch display area AR22. In the inquiry display area AR21, inquiry content (for example, characters) and the like for confirming to the user U whether to execute the production is displayed. In the example of FIG. 13, the inquiry display area AR21 displays character information "Would you like to execute a production that matches the parade?" The switch display area AR22 includes, for example, icons IC21, IC22, and IC23. The icon IC 21 is a graphical user interface (GUI) switch that receives permission to perform a production that matches the parade. The icon IC 22 is a GUI switch that receives transition to a screen for adjustment (detailed setting) of the production (operations). The icon IC 23 is a GUI switch that receives permission or denial of performing the production that matches the parade.

When the icon IC21 is selected, for example, a production in accordance with each object participating in the parade as shown in FIG. 11 is executed. When the icon IC 22 is selected, for example, there is a transition to a screen where the user U makes adjustments such as whether the boarding-type mobile object 300 turns, acceleration or deceleration of the turning speed, presence or absence of a voice output, and whether the light emitter emits light. This allows the user to set production content according to his/her own preference and the surrounding environment. For example, when there are a lot of people in the vicinity, since the turning operation or emitting light may cause inconvenience to others, the user U performs adjustments to suppress an operation or an output, such as decreasing a turning speed below a reference speed, reducing the amount of light emission, according to his or her own determination, thereby enjoying the production without disturbing the people in the vicinity. Conversely, when there are no people in the vicinity, the turning speed is accelerated above the reference speed and the amount of light emission is adjusted to be larger. After these adjustments are completed, a production is executed with production content set in detailed settings by returning to the image IM20 and selecting IC21. When the icon IC23 is selected, the production is not performed even if it is present within a predetermined distance from the point where the parade is performed. As a result, the user U can enjoy the parade with his/her favorite production. The terminal device 200 may transmit information on these adjustments to the mobile object management server 100, acquire an adjusted new event operation command, and transmit it to the boarding-type mobile object 300, and the terminal device 200 may directly adjust parameters and the like of the event operation command obtained from the mobile object management server 100.

The mobile object management server 100 may refer to the user information 182, and, when the user U who is boarding is a child (for example, 12 years old or younger), perform adjustments such as lowering the rotation speed during turning compared to when the user is an adult, or canceling the user U settings. This allows each user U to perform a safer operation. Therefore, even if the user U is a child, the parent can allow the child to use the boarding-type mobile object 300 with confidence.

[About Group Operation]

Figure 14:
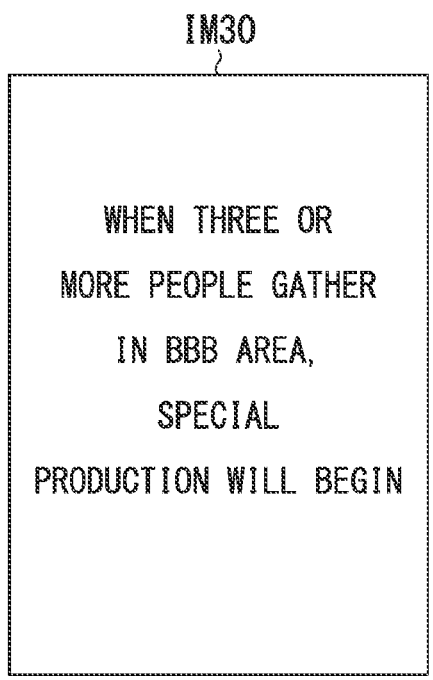
FIG. 14 is a diagram which shows an example of an image regarding a group operation.

When a plurality of boarding-type moving bodies are present in a predetermined area, the mobile object management server 100 may generate an operation command by selecting an operation mode and an output mode for each group unit. In this case, the manager 140 may generate information on the group operation and provide the generated information to the terminal device 200. FIG. 14 is a diagram which shows an example of the image IM30 regarding the group operation. The image IM30 shown in FIG. 14 displays character information indicating execution conditions of the group operation. In the example of FIG. 14, character information such as "When three or more people gather in a BBB area, a special production will begin." is displayed. This information may be transmitted to the terminal device 200 connected to the boarding-type mobile object 300 present within the area BBB or within a predetermined distance from the area BBB, and may also be transmitted to the terminal device 200 of a preset user (for example, a child). This makes it possible to provide more diverse productions using the boarding-type mobile object 300.

Figure 15:
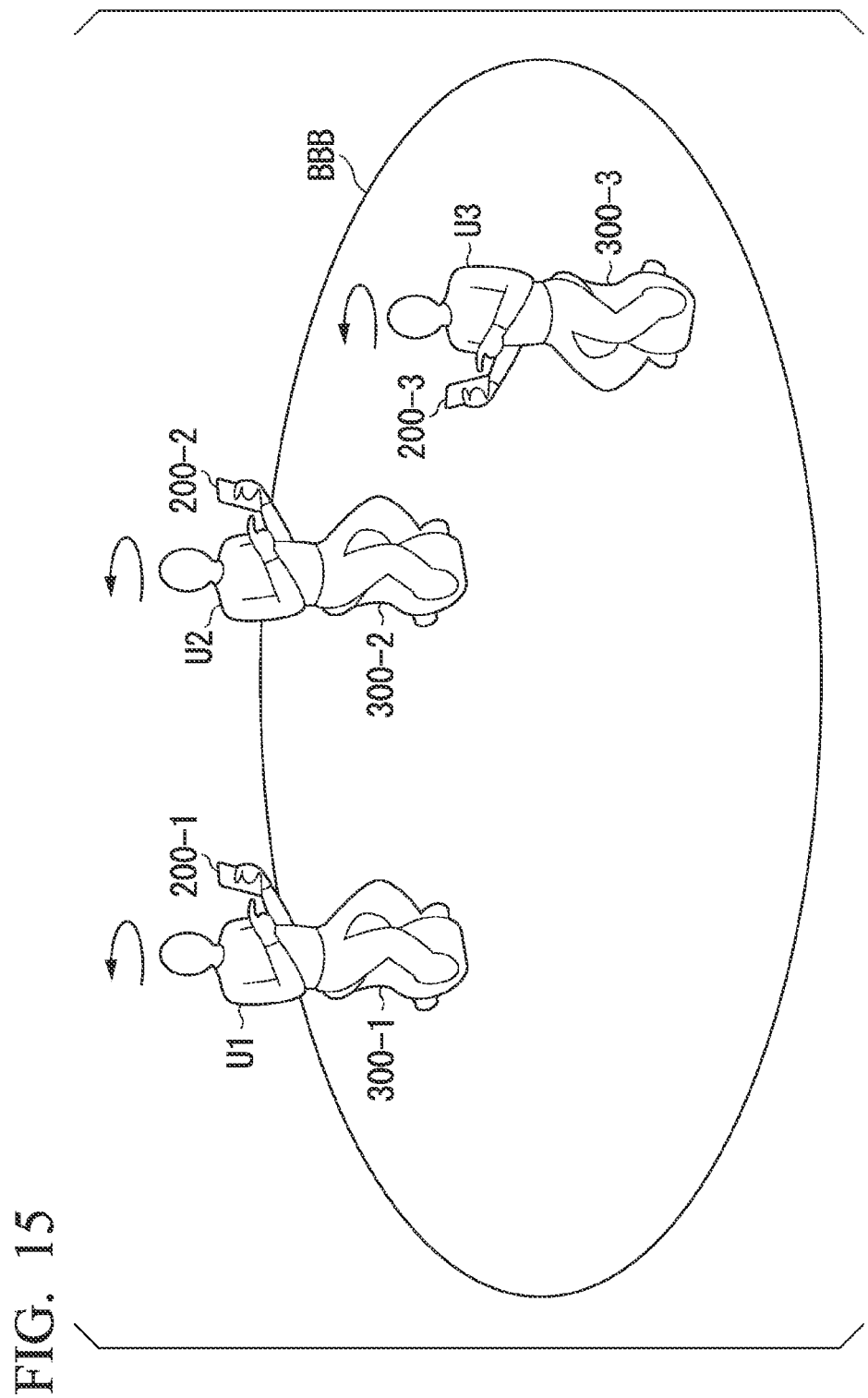
FIG. 15 is a diagram for describing a specific example of the group operation.

FIG. 15 is a diagram for describing a specific example of the group operation. In the example of FIG. 15, there are three boarding-type moving bodies 300-1 to 300-3 that users U1 to U3 are boarding, respectively, in the area BBB. When the mobile object management server 100 determines that there are three boarding-type moving bodies within the BBB area based on the positional information of the boarding-type moving bodies 300-1 to 300-3, it transmits an operation command including a rotation operation to the terminal devices 200-1 to 200-3. The terminal devices 200-1 to 200-3 transmit operation commands to the boarding-type moving bodies 300-1 to 300-3 with which they are communicating, respectively. As a result, the boarding-type mobile object 300 that has received the operation command transmitted from the terminal device 200 executes the rotation operation of the group operation. As a result, the boarding-type mobile object 300 in the area BBB can perform a similar or related operation, and thus the production effect can be further enhanced. For example, in place of (or in addition to) the rotating operation, control such as outputting sounds of different musical instruments from speakers, or outputting the same color or different colors from light emitters may be performed. The group operation described above may be executed when within a predetermined distance from the point of performance at the performance time of an event, or may be executed at a time or a place where the event is not being performed.

<Modified Example>

In the embodiment described above, the boarding-type mobile object 300 is caused to perform operations and outputs in accordance with the performance of an event, but, in addition to this, the terminal device 200 may also control an operation and an output associated with the performance of an event. In this case, the mobile object management server 100, for example, activates a vibration function provided in the terminal device 200 in accordance with an event or outputs a predetermined sound from the speaker, creates an event operation command for causing the display or the like to emit light, and transmits the generated operation command to the terminal device 200. In this manner, through operation of various devices according to an event, it is possible to further improve the production effect on the user U.

In the embodiment, the control of the operation mode and the output mode for the boarding-type mobile object 300 that the user U is on has been mainly described, but the boarding-type mobile object 300 that the user U is not boarding may also be caused to execute an operation according to an event. In this case, the boarding-type mobile object 300 is provided with a positional information acquirer that acquires positional information and a communication function that communicates with the mobile object management server 100, the mobile object management server 100, when the user U is not boarding, can cause a boarding-type mobile object present within a predetermined distance from the performance point of the event to execute a specific operation, corresponding to performance of the event, by acquiring positional information and the like from the boarding-type mobile object 300. As a result, the boarding-type mobile object 300 can be used to further enhance the production effect of the event. Instead of using the positional information of the terminal device 200, if the boarding-type mobile object 300 is provided with a position acquirer, the mobile object management server 100 communicates directly with the boarding-type mobile object 300 without going through the terminal device 200.

In the embodiment, the terminal device 200 is carried by the user U1, but it may be lent together with the boarding-type mobile object 300 by the mobile object management system 1. In this case, the mobile object management server 100 manages the terminal device 200 and the boarding-type mobile object 300 in association with each other in advance. In this case, the user information 182 may not include individual information of the user U (authentication information, address, name, age, sex) and the like. As a result, even the user U (for example, a child or an elderly person) who does not carry a terminal device 200 can use this service.

According to the embodiment described above, the mobile object management server (mobile object management device) 100 manages the boarding-type mobile object 300 that moves within a predetermined area with a user on board and includes an acquirer 130 configured to acquire positional information of the boarding-type mobile object 300, a manager 140 configured to manage the boarding-type mobile object 300 and the terminal device 200 of a user on the boarding-type mobile object 300 in association with each other, and an event operation commander 160 configured to cause the boarding-type mobile object 300 to execute a predetermined operation in accordance with an event via the terminal device 200 of the user on the basis of the positional information and information on an event performed in the predetermined area, and thereby it is possible to further improve a production effect of an event while suppressing costs.

According to the embodiment, since there is no need to install a new communication facility in an area such as a theme park for performing communication between the mobile object management server 100 and the boarding-type mobile object 300, and the communication can be performed via the terminal device 200 carried by the user U, it is possible to suppress equipment costs.

The embodiment described above can be expressed as follows.

A mobile object management system is configured to include a storage device that has stored a program and a hardware processor, and the hardware processor executes the program stored in the storage device, and thereby, acquiring positional information of a boarding-type mobile object that moves within a predetermined area with a user on board, managing the boarding-type mobile object and a terminal device of a user on the boarding-type mobile object in association with each other, and causing the boarding-type mobile object to execute a predetermined operation in accordance with an event performed within the predetermined area via the terminal device of the user on the basis of the positional information and information on the event.

As described above, a mode for implementing the present invention has been described using the embodiments, but the present invention is not limited to such embodiments at all, and various modifications and substitutions can be added within a range not departing from the gist of the present invention.

What is claimed is:

1. A mobile object management device that manages a boarding-type mobile object that moves within a predetermined area with a user on board comprising:
    at least one processor configured to:
    acquire, via a terminal device of the user on the boarding-type mobile object, positional information of the boarding-type mobile object;
    manage the boarding-type mobile object and the terminal device of the user on the boarding-type mobile object in association with each other; and
    cause the boarding-type mobile object to execute a predetermined operation in accordance with an event performed in the predetermined area via the terminal device of the user based on the positional information and information on the event, wherein the event includes a performance of a timed coordination of a movement of the boarding-type mobile object.

2. The mobile object management device according to claim 1, wherein the at least one processor is configured to:
    select a predetermined operation to be executed by the boarding-type mobile object based on a distance between a point in the predetermined area where the event is performed and the boarding-type mobile object, and a performance time of the event.

3. The mobile object management device according to claim 2, wherein the at least one processor is configured to:
    select a predetermined operation to be executed by the boarding-type mobile object based on a distance between an object related to the event and the boarding-type mobile object.

4. The mobile object management device according to claim 1, wherein the positional information is first positional information, and wherein the at least one processor is configured to:
    acquire second positional information of the terminal device from the terminal device of the user on the boarding-type mobile object and acquire second positional information representing a position within the predetermined area of the boarding-type mobile object.

5. The mobile object management device according to claim 1, the at least one processor is configured to:
    cause a boarding-type mobile object present within a specific range less than the predetermined area to execute a predetermined operation based on the basis of the number of the boarding-type moving bodies present within the specific range.

6. The mobile object management device according to claim 1,
    wherein the event includes a parade or a show that is performed in the predetermined area.

7. The mobile object management device according to claim 1,
wherein the predetermined operation includes music output in relation to performance of the event, light emission, or an operation matching an operation of an object related to the event.

8. The mobile object management device according to claim 1,
wherein the predetermined operation includes an operation of outputting sound from an audio output provided in the boarding-type mobile object.

9. The mobile object management device according to claim 1,
wherein the predetermined operation includes an operation of causing a light emitter provided in the boarding-type mobile object to emit light.

10. The mobile object management device according to claim 1, the at least one processor is configured to:
notify the user of information on conditions under which the predetermined operation is executed for the boarding-type mobile object.

11. The mobile object management device according to claim 1, the at least one processor is configured to:
adjust content of the predetermined operation based on information on the user on the boarding-type mobile object or a surrounding environment of the boarding-type mobile object.

12. The mobile object management device according to claim 1, the at least one processor is configured to:
adjust content of the predetermined operation based on setting content from the user on the boarding-type mobile object.

13. The mobile object management device according to claim 1,
wherein the event includes a performance of an audio input directed into the boarding-type mobile object, and an emission of light into or surrounding the boarding-type mobile object.

14. A mobile object management method comprising:
by a computer of a mobile object management device that manages a boarding-type mobile object moving within a predetermined area with a user on board,
acquiring, via a terminal device of the user on the boarding-type mobile object, positional information of the boarding-type mobile object;
managing the boarding-type mobile object and the terminal device of the user on the boarding-type mobile object in association with each other; and
causing the boarding-type mobile object to execute a predetermined operation in accordance with an event performed within the predetermined area via the terminal device of the user based on the positional information and information on the event, wherein the event includes a performance of a timed coordination of a movement of the boarding-type mobile object.

15. A computer-readable non-transitory storage medium that has stored a program causing
a computer of a mobile object management device that manages a boarding-type mobile object moving within a predetermined area with a user on board to
acquire, via a terminal device of the user on the boarding-type mobile object, positional information of the boarding-type mobile object,
manage the boarding-type mobile object and the terminal device of the user on the boarding-type mobile object in association with each other, and
cause the boarding-type mobile object to execute a predetermined operation in accordance with an event performed within the predetermined area via the terminal device of the user based on the positional information and information on the event, wherein the event includes a performance of a timed coordination of a movement of the boarding-type mobile object.

* * * * *